(12) United States Patent
Ivashin et al.

(10) Patent No.: US 9,035,969 B2
(45) Date of Patent: May 19, 2015

(54) METHOD FOR MULTIPLE PROJECTOR DISPLAY USING A GPU FRAME BUFFER

(71) Applicant: Seiko Epson Corporation, Tokyo (JP)

(72) Inventors: Victor Ivashin, Danville, CA (US);
Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 310 days.

(21) Appl. No.: 13/688,285

(22) Filed: Nov. 29, 2012

(65) Prior Publication Data

US 2014/0146080 A1   May 29, 2014

(51) Int. Cl.
| | |
|---|---|
| G09G 5/00 | (2006.01) |
| G06T 3/00 | (2006.01) |
| G09G 5/12 | (2006.01) |
| G06F 3/14 | (2006.01) |
| G06T 3/40 | (2006.01) |
| H04N 9/31 | (2006.01) |

(52) U.S. Cl.
CPC ............... *G06T 3/0025* (2013.01); *G09G 5/12* (2013.01); *G06F 3/1446* (2013.01); *G06T 3/4038* (2013.01); *H04N 9/3147* (2013.01); *H04N 9/3182* (2013.01); *H04N 9/3185* (2013.01)

(58) Field of Classification Search
CPC .................. G06F 3/1423–3/1446; G09G 5/12; G09G 5/399
USPC .................................................. 345/545–551
See application file for complete search history.

(56) References Cited

U.S. PATENT DOCUMENTS

| | | | |
|---|---|---|---|
| 6,667,745 B1 * | 12/2003 | Hussain | 345/545 |
| 7,859,542 B1 * | 12/2010 | Williams et al. | 345/545 |
| 7,901,094 B2 | 3/2011 | Tan et al. | |
| 8,102,332 B2 | 1/2012 | Nelson et al. | |
| 2002/0008697 A1 | 1/2002 | Deering | |
| 2005/0140688 A1 * | 6/2005 | Pallister | 345/582 |
| 2006/0285077 A1 * | 12/2006 | Miyasaka | 353/30 |
| 2010/0321408 A1 * | 12/2010 | Miceli et al. | 345/643 |
| 2011/0019108 A1 * | 1/2011 | Nelson et al. | 348/745 |
| 2011/0050873 A1 * | 3/2011 | Nelson | 348/61 |
| 2011/0050887 A1 * | 3/2011 | Nelson | 348/135 |
| 2011/0051094 A1 * | 3/2011 | Nelson | 353/31 |
| 2011/0057943 A1 * | 3/2011 | Ivashin | 345/582 |
| 2011/0058098 A1 * | 3/2011 | Ivashin | 348/362 |
| 2011/0228104 A1 * | 9/2011 | Nelson | 348/190 |
| 2011/0234896 A1 * | 9/2011 | Ivashin et al. | 348/445 |
| 2011/0234920 A1 * | 9/2011 | Nelson | 348/745 |
| 2011/0234921 A1 * | 9/2011 | Ivashin | 348/745 |
| 2011/0234922 A1 * | 9/2011 | Nelson et al. | 348/745 |

FOREIGN PATENT DOCUMENTS

EP      1583072 A1    10/2005

* cited by examiner

*Primary Examiner* — Xiao Wu
*Assistant Examiner* — Charles Tseng

(57) ABSTRACT

A primary image is transformed into secondary images for projection, via first and second frame buffers and view projection matrixes. To do so, a first image is loaded into the first frame buffer. A calibration data set, including the view projection matrixes, is loaded into an application. The matrixes are operable to divide and transform a primary image into secondary images that can be projected in an overlapping manner onto a projection screen, providing a corrected reconstruction of the primary image. The first image is rendered from the first frame buffer into the second images, by using the application to apply the calibration data set. The second images are loaded into a second frame buffer, which can be coupled to the video projectors.

20 Claims, 5 Drawing Sheets

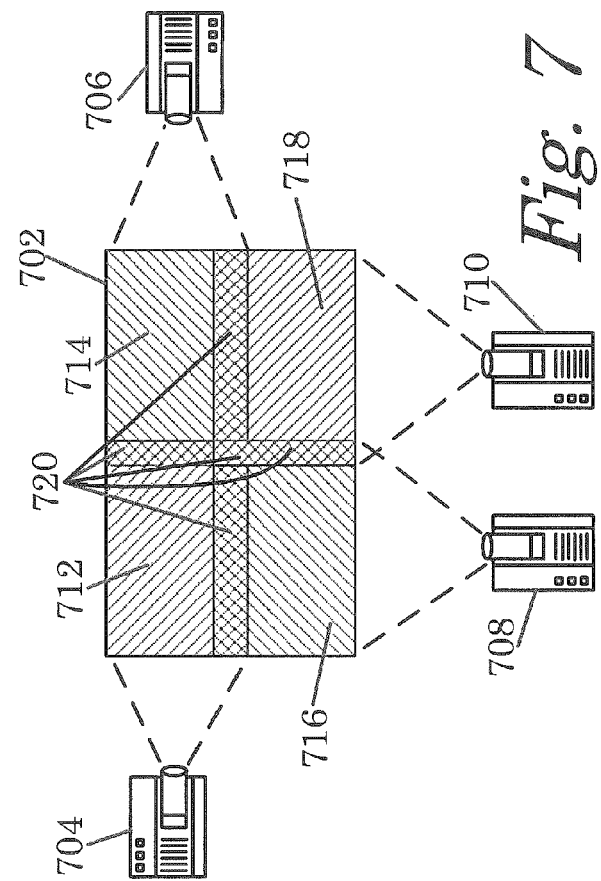

METHOD FOR MULTIPLE PROJECTOR DISPLAY USING A GPU FRAME BUFFER

BACKGROUND

The display hardware technology in a typical computer video card continues to develop at a rapid rate. Such developments have resulted in increased 2D and 3D graphics processing power, large onboard memories for handling high resolution content, and support for multiple display outputs. With lower device costs, today's video hardware coupled with multiple display devices is becoming common. Tight driver integration within operating systems to support said video hardware has allowed the user to access many desktops on multiple screens. This provides several work surfaces to place and operate with applications.

Multiple monitors attached to a video card may be grouped physically and then logically within a computer operating system to define a virtual desktop. The combined resolutions of the multiple displays form a virtual desktop environment, providing large views of the operating system windows. Some display hardware vendors have provided as many as 6 outputs on a single graphics card offering many monitor display configurations.

Using projectors instead of monitors as the display output device, it is possible to create a seamless display for the large virtual desktop content. Ideally, such a system would include an easy calibration and processing mechanism to correct for the overlapping regions among the projectors' outputs.

SUMMARY OF INVENTION

A method is described to provide automatic and seamless blending of the output from multiple overlapping video projectors to form a cohesive seamless display using a graphics pipeline enabled with a modifiable render buffer prior to final video signal output to a set of connected projectors. This method extends an existing and previously disclosed projector platform and the scope of this document assumes a familiarity with that and related multi-projector display technologies in this area including EPSON's view projection matrix.

Other objects and attainments together with a fuller understanding of the invention will become apparent and appreciated by referring to the following description and claims taken in conjunction with the accompanying drawings.

In some embodiments, a method for preparing an image for projection is provided. A first image is loaded into a first frame buffer. A calibration data set is loaded into an application. The calibration data set includes a plurality of view projection matrixes. The view projection matrixes are operable to divide and transform a primary image into a plurality of secondary images. The secondary images are projected by respective video projectors in an overlapping manner onto a projection screen, thereby providing a corrected reconstruction of the primary image.

The first image is rendered from the first frame buffer into a plurality of second images. The rendering is accomplished by using the application to apply the calibration data set. Each of the second images corresponds to a respective one of the video projectors. The second images are loaded into a second frame buffer. The second frame buffer is configured to couple to the respective video projectors.

In some embodiments, a non-transient, tangible, computer readable medium is provided. The medium has thereupon instructions for a computer. The computer loads a first image into a first frame buffer. A calibration data set is loaded into an application. The calibration data set includes a plurality of view projection matrixes. The view projection matrixes are operable to transform a primary image into a plurality of secondary images that are projected by respective video projectors in an overlapping manner onto a projection screen as a corrected reconstruction of the primary image.

The first image is rendered from the first frame buffer into a plurality of second images. This rendering is by using the application and the calibration data set to divide and transform the first image into the plurality of second images. Each of the second images corresponds to a respective one of the video projectors. The second images are loaded into a second frame buffer. The second frame buffer is configured to couple to the respective video projectors.

In some embodiments, a system for projecting an image is provided. The system includes a plurality of video projectors, a first frame buffer, a second frame buffer, a memory and a computer. The video projectors are arranged to project respective images in an overlapping manner onto a projection screen. The computer is coupled to the first frame buffer, the second frame buffer and the memory. The second frame buffer is coupled to the video projectors. The computer is programmed to load a first image into the first frame buffer. A calibration data set is loaded into the memory. The calibration data set includes a plurality of view projection matrixes. The view projection matrixes are operable to divide and transform a primary image into a plurality of secondary images that are projected by the video projectors in an overlapping manner onto a projection screen. Thereby, a corrected reconstruction of the primary image is provided.

The first image is rendered from the first frame buffer into a plurality of second images, as a result of applying the calibration data set. Each of the second images corresponds to a respective one of the video projectors. The second images are loaded into the second frame buffer, for projection.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments. In the drawings, like reference symbols refer to like parts.

FIG. 4 is a symbolic diagram of an image loaded into a first frame buffer, such as the first frame buffer of FIG. 3.

FIG. 5 is a symbolic diagram of a second frame buffer, an output frame buffer, composed with the image of FIG. 4 and being divided into multiple regions.

FIG. 6 is a symbolic diagram of a second frame buffer, such as the second frame buffer of FIG. 3, being divided into multiple regions, with each region having a sub-region.

FIG. 7 is a schematic diagram of multiple video projectors projecting overlapping images onto a projection screen.

DESCRIPTION OF THE PREFERRED EMBODIMENTS

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In various embodiments, an image from a first frame buffer is divided into multiple regions and transformed into a plurality of images loaded into a second frame buffer, as a result of applying a calibration data set with a plurality of view projection matrixes. Multiple video projectors are aimed at a projection screen. Each video projector projects a respective one of the transformed images from the second frame buffer onto the screen. The images are projected in an overlapping manner, such that the original image from the first frame buffer is seamlessly reconstructed on the projection screen.

Figure 1:
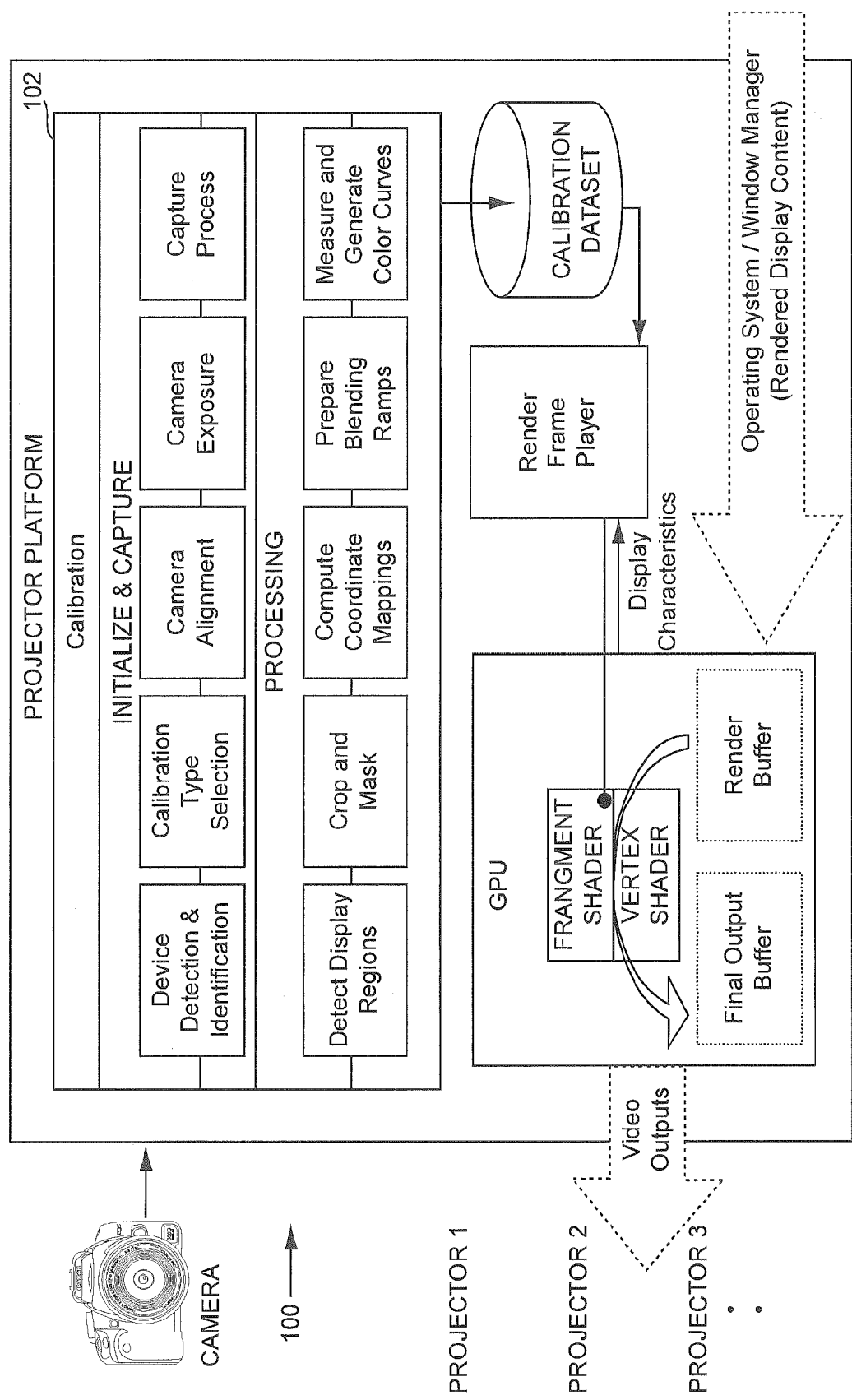
FIG. 1 is a block diagram of a system for projecting an image in accordance with an embodiment of the present invention. A calibration component provides a calibration data set for use in embodiments.

The embodiments for the projection system described herein provides a seamless unified display across overlapping output from a set of commodity projectors has already been well defined in prior disclosures. The calibration component 102 of the system 100, and as outlined in FIG. 1, is known. The calibration component is described in U.S. Pat. Nos. 8,102,332 and 7,901,094, which are hereby incorporated by reference in their entirety for all purposes. Essentially, the calibration component 102 of the system 100 can provide a calibration data set that includes projection matrixes. The view projection matrixes are operable to divide and transform a primary image into a plurality of secondary images. The secondary images are projected by respective video projectors in an overlapping manner onto a projection screen, and provide a corrected reconstruction of the primary image.

The present disclosure discusses improvements in a video card GPU (graphics processing unit) and processing pipeline which can aid a new playback mechanism to provide a similar seamless display on the projectors but can source content from any graphics card host process (i.e. the operating system, windows manager, or application). This replaces the prior system's player module (see FIG. 2) which required specialized content inputs and replaces any operating system desktop warping hooks to gain access to low-level desktop content.

Figure 2:
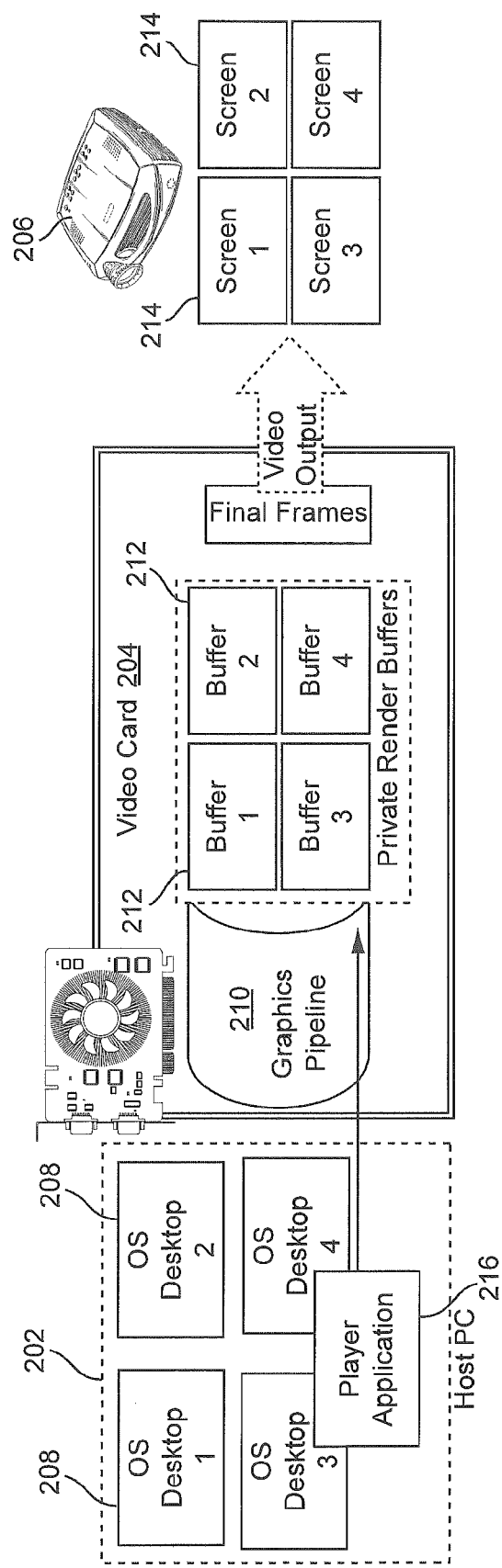
FIG. 2 is a block diagram of a known video card interacting with a known operating system, managing multiple output display devices.

As seen in FIG. 2, the operating system 202 and the typical video card 204 manage and maintain mappings between display output devices 206 (one example shown) and operating system desktops 208. In general, each desktop 208 is managed and rendered through the graphics card pipeline 210 to a private buffer 212 for output on a corresponding display device 206.

For example, four display screens 214 are connected to a video card 204. These screens 214 are enumerated by the operating system and the user is allowed to create four desktops 208 with a desirable output resolution for each display device 206. The desktops 208 may be logically configured relative to one another within the operating system window manager to form a rectangle virtual desktop surface. This provides the operating system with information so that a mouse pointer moved passed the edge of one desktop may, for example, be transferred to the appropriate next desktop.

In this configuration, content is provided to the video card 204 and rendered through the graphics pipeline 210. Such rendered content is stored within an application's screen buffers which are assembled into appropriate render buffers 212 for final display on the output devices 206. A player application 216, for example, can utilize all the operating system desktops 208 so that the player application can control the rendered content to all the render buffers 212, thus ensuring output on desired display screens. The trouble with this configuration is that the player application, running within the operating system, must be supplied with the content to render through the graphics pipeline 210. Operating system content and third-party applications tend to operate with their own graphics pipeline instance. In addition, buffers are located within their own memory location and on the video card in a private context. In this configuration, the content is unavailable to the player application. This configuration is challenging for multi-projector display solutions that are required to operate with all computer application content.

Figure 3:
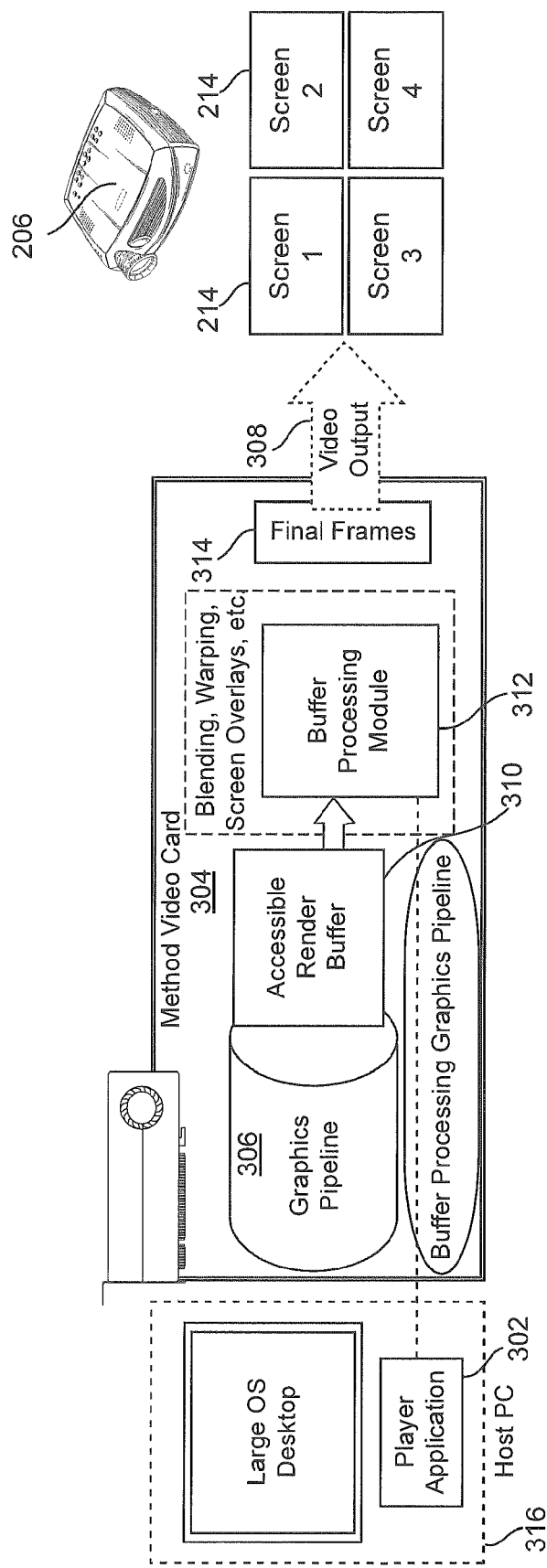
FIG. 3 is a block diagram of a video card with first and second frame buffers, interacting with an application in accordance with an embodiment of the present invention.

In the alternate configuration as described herein, the player application 302 takes advantage of an alternate configuration for video card 304 and processing pipeline 306 shown in FIG. 3. In this example, the video card 304 is configured again with hardware outputs, e.g., video output 308, that connect to multiple display devices 206 (one example shown). However, unlike the typical video card, the logical display configuration of these output devices is handled by the graphics card driver and not the operating system. The graphics card (i.e., video card) 304 provides a single large render buffer 310 to the operating system as if a single large resolution display were connected. In this configuration, the operating system's "virtual desktop" is a high resolution union of the individual display screen resolutions.

A render buffer 310 within the video card is divided, prior to final frame output to each display screen, according to the resolution display characteristic of each display screen. One element of this pipeline is that the render buffer 310 is accessible by a buffer processing module 312 which acts on the render buffer 310 and forwards the results to a final frames module 314 for division among each display screen output, i.e., division among the plurality of video outputs shown as the video output 308. The render buffer 310 can be considered to have a first frame buffer, and the final frames module 314 can be considered to have a second frame buffer. The buffer processing module 312 is controlled by a player application 302 running on the host computing device 316 and in cooperation with a graphics card pipeline application programming interface (API). This buffer processing module 312, as used within this disclosure, provides blending, warping, screen overlays, and other operations using a view projection matrix to form the seamless multi-projector display.

Since the operating system desktop and all running applications operate within the normal graphics pipeline, their final rendered content is placed into a render buffer hosted by the video card. The buffer is typically private and is passed directly to video signal processors that divide output signals to the displays. Here the buffer 310 is accessible and read by an application controlled buffer processing module 312 which can use a separate graphics pipeline to change or alter the content before passing the final result to the video signal processors. This feature allows access to any content input or generated by the GPU and thus provides a framework for adding a seamless multi-projector display solution. It should be appreciated that render buffer 310 and/or buffer processing module 312 are not limited to placement on graphics card 304. In alternative embodiments, render buffer and/or buffer processing module 312 may be placed external to graphics card 304, e.g., on another video or graphics card.

When the render frame player application 302 described here begins operation (i.e. invoked by the user or launched as a system process), player application 302 loads a calibration dataset containing a view projection matrix for each display screen created by a prior calibration method, for example using the calibration component 102 of the system 100 of FIG. 1. This may be a calibration dataset selected by a user or from a previously configured setting in some embodiments. As each view projection matrix is loaded, a logical offset within the render buffer 310 for each associated display screen 214 is computed.

Next, the specialized buffer processing graphics pipeline context is established for the player application 302. This configures the render frame player application 302 to host the buffer processing module 312 on the video card 304 and not use the native graphics pipeline 306. The render frame player 302 does not necessarily provide an application window within the operating system, but could provide one for adapting operational settings. In one embodiment, the render frame player 302 is essentially an OpenGL application with a specialized graphics context maintained on the video card 304.

A fragment shader and vertex shader are provided and loaded into the GPU by the render frame player 302. Like the projection system's player application, these modules will apply a calibration data set, utilizing the view projection matrixes to perform the geometric transforms and apply appropriate blending ramps, black level adjustments, and color adjustments necessary on the source content to provide a seamless display when output on the connected projectors 206.

For each projector 206 and view projection matrix, the render frame player 302 configures the buffer processing module 312 to source content from the appropriate location within the accessible render buffer 310. Since it is likely unknown when content is written into the accessible render buffer 310 by graphics pipelines 306 used by the operating system or application windows, the method processes the accessible render buffer 310 on a fixed rate schedule (i.e. frames per second), process according to some video card signal (such as during a vertical sync interval), or some externally directed signal. The processing involves dividing and transformation of source content from the render buffer 310 to the final frame output according to a setup display characteristic as configured within each view projection matrix with the assistance of vertex and fragment shaders. The process ends when the render frame player application is stopped.

Figure 8:
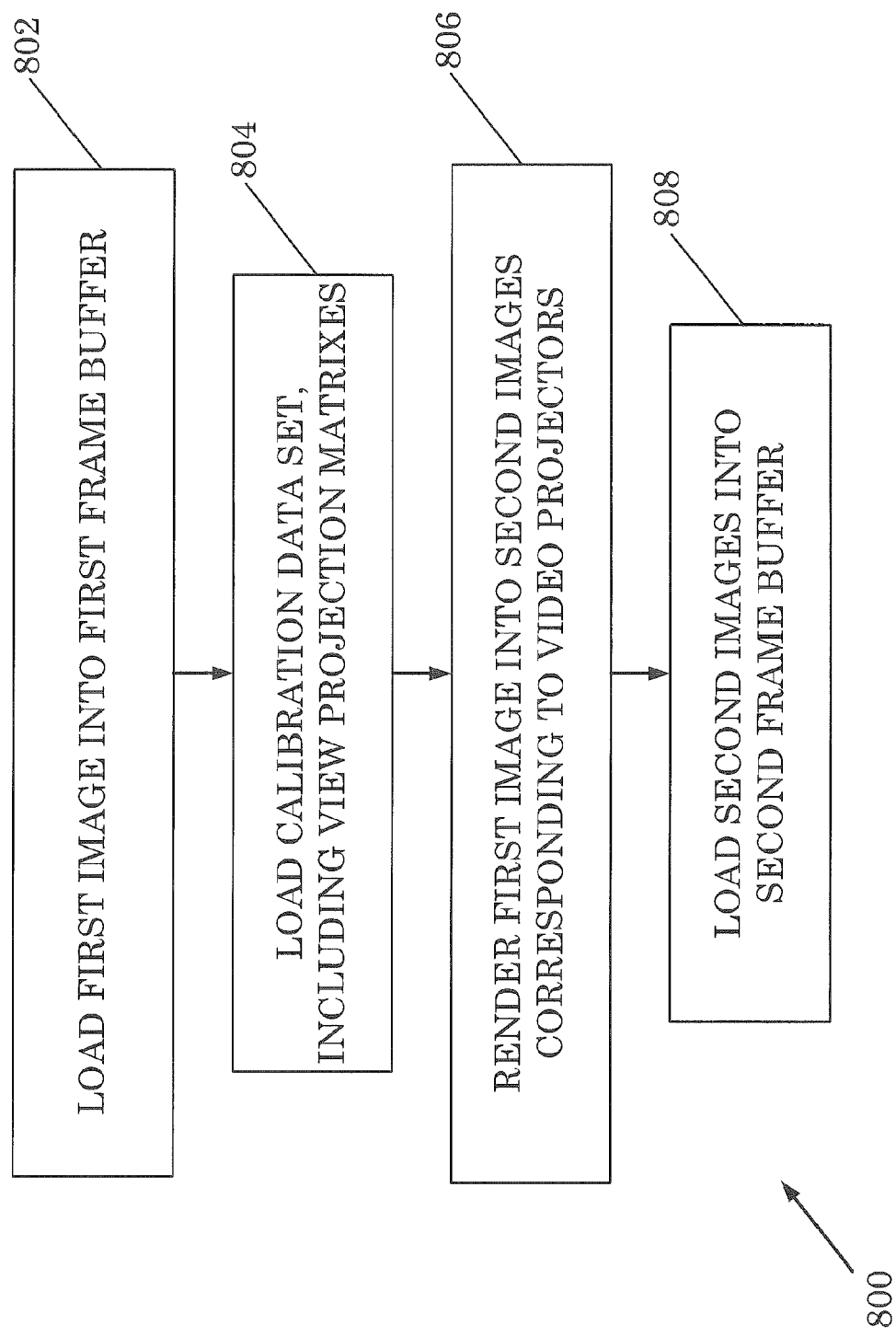
FIG. 8 is a flow diagram of an embodiment of a method for preparing an image for projection.

FIGS. 4-7 illustrate aspects of the rendering and display processes, and FIG. 8 shows an embodiment of a method for preparing an image for projection.

In FIG. 4, a primary image 404 is loaded into a first frame buffer 402. In one embodiment, the first frame buffer 402 includes or is included in the accessible render buffer 310 (see FIG. 3). If the image 404 were projected by a single projector onto a projection screen, the image would appear as shown in FIG. 4, i.e., a corrected reconstructed image.

In FIG. 5, a frame buffer 502 is shown symbolically divided into a plurality of regions 504, 506, 508, 510, in this example four regions, as indicated by the buffer division dashed lines 512. A person skilled in the art can readily devise such a buffer division using address ranges and memory cells in the electronic circuitry and in the software and/or firmware operating the buffer. If the projectors outputting their respective buffer regions were perfectly aligned without overlap, a displayed image as projected onto a projection screen, with simple division of the primary source content, would match the image shown in FIG. 5. The primary image 404 from FIG. 4 is shown in FIG. 5 symbolically divided into the same number of secondary images 514, 516, 518, 520, in this example four secondary images, corresponding to the symbolic division of the frame buffer 502.

The division of the frame buffer is performed by the graphics card at final output and directs each buffer region to a projector output (see FIG. 7). The application operates on the content of the entire first frame buffer to compose the entire second frame buffer. Since the divisions of the second frame buffer are known by the application, secondary images are composed to fill each divided region. Each associated secondary image can thus addresses every pixel of a particular target projector. Note, that each pixel of a secondary image is constructed through the application player process by sourcing content from the entire scene (i.e., entire first image buffer). For example, the view projection matrix for projector one may source some pixel data from the first image buffer that is also sourced by the view projection matrix for projector two (i.e., in a blending regions, etc.).

FIG. 6 symbolically shows application of warping and edge blending of source content in construction of the secondary images, in further preparation for projection. Source content is warped in the construction of the secondary images which fill each divided output buffer region. This is the role of the view projection matrix, to map appropriate source pixels to output pixels. Each region 604 of the frame buffer 602 has a sub-region 606 defined within the region 604. The sub-region 606 is warped to account for alignment of a respective video projector relative to a projection screen. The respective secondary image is similarly warped (not shown, for clarity) according to the warping of the sub-region 606. For example, the sub-region 606 shown in FIG. 6 is warped for projection by a video projector that is projecting from an offset to the left of a centerline to a corresponding quadrant of a projection screen. Without the warping, the projected image would have a larger right side border as compared to the left side border of the projected image. Warping is applied in a related manner to the other subregions of the frame buffer 602 and to the other respective secondary images.

Edge blending is applied along edges 608 of the subregion 606, i.e., along edges 608 of the respective secondary image. When the secondary images are projected in an overlapping manner onto the projection screen, the edge blending smooths brightness levels in the overlapping of the secondary images and results in an even transition from one of the secondary images to another of the secondary images.

In various embodiments, one or more of warping, edge blending, blending ramps, black level adjustments and color adjustments as applied along overlapping edges of the secondary images results in matching at the regions of mutual overlap when the secondary images are projected onto the projection screen. It should be appreciated that, depending on the situation, one or a combination of these features present in the view projection matrixes and/or the calibration data set may be effective at providing a seamless (or essentially seamless) reconstructed primary image when the secondary images are projected.

FIG. 7 shows one embodiment of multiple video projectors 704, 706, 708, 710 projecting overlapping images onto a projection screen 702. Each projector 704, 706, 708, 710 has a respective projection region 712, 714, 716, 718. The projection regions overlap, in overlap regions 720. Application of the calibration data set and view projection matrixes to the primary image results in divided and transformed secondary images being projected through the respective multiple video projectors in a manner that reproduces the primary image on the projection screen. That is, the secondary images are projected in an overlapping manner by the multiple video projectors so as to produce a corrected reconstruction of the primary image on the projection screen. As a further example, each projector may have a projection region that would appear approximately as rectangular (or square) when projected on a screen directly in front of the projector, but which appears rectangular with curved edges, or trapezoidal etc. as projected on a screen at larger magnification or from off axis. The warped images of FIG. 6 would reconstruct a rectangular (or square) scene in FIG. 7. It should be appreciated that the effective "resolution" of an image on the projection screen 702 is smaller than the resolution of frame buffer 402/502/602 because of the overlapping regions. It should also be appreciated that usable "resolution" of an image on the projection screen 702 may be even smaller if the screens are not so well aligned or are angled with respect to the wall, as the maximum rectangular region that fits inside the union of the displays will hold the source buffer 402 content.

For contrast, if the view projection matrixes were not applied to the divided primary image, the overlap of the secondary images on the projection screen would not accurately reproduce the primary image. Various defects would appear in an un-corrected reconstruction of the primary image. Overlap regions 720 would appear as bright seams in the reconstruction of the primary image. Gaps between projected secondary images could appear in the reconstruction of the primary image. Curvature distortion could appear along edges of and throughout secondary images. Misalignment could appear along portions of opposed edges of paired secondary images. Mismatch in brightness between or among the secondary images could occur. These and other defects in what would be uncorrected reconstructions of the primary image are accounted for and corrected by the application of the view projection matrixes, blending ramps, color adjustments, and other calibration data set information.

Various embodiments include arrangements for two projectors, three projectors, four projectors, etc. The calibration data set and view projection matrixes may correct for lens distortion, placement distortion, different brightness levels in projectors arising from aging components, differing brands or models of projectors, and may correct for differing alignments of the projectors relative to the projection screen, differing resolutions, differing magnification factors among the projectors and so on.

To prepare an image for projection through multiple video projectors, embodiments of the method 800 shown in FIG. 8 may be applied. Embodiments of the method 800 may be practiced using the calibration data set of FIG. 1, the first and second frame buffers of FIG. 3 and the multiple video projectors of FIG. 7. The calibration data set may be built based on analyzing at least one test image as projected onto a projection screen by at least one of the video projectors. In one embodiment, a calibration process applies several test images, which are projected one-by-one from each projector.

In a block 802, the first image is loaded into the first frame buffer. For example, the first image may be a primary image. The first frame buffer may be the accessible render buffer 310 on a graphics processing unit or elsewhere on the video card 304 of FIG. 3 in some embodiments.

In a block 804 of FIG. 8, the calibration data set is loaded. The calibration data set includes view projection matrixes. For example, the view projection matrixes may be determined, generated or created using the calibration component 102 of the system 100 of FIG. 1. The calibration data set may be loaded into a memory coupled to a computer. For example, in one embodiment the calibration data set is loaded into an application, such as the player application 302 of FIG. 3. In other embodiments, portions of the calibration data set, such as the view projection matrix, are also transferred/loaded into the graphics card for processing use by the fragment shader and vertex sharer elements.

In a block 806 of FIG. 8, the first image is rendered into second images. The second images correspond to respective video projectors. For example, the second images may be secondary images. The first image may be rendered into a plurality of second images, by using the application to apply the calibration data set. The application and the calibration data set may be used to divide and transform the first image into the plurality of second images. The calibration data set may be applied within a buffer processing module, such as the buffer processing module 312 of the video card 304, which receives the first image from the first frame buffer.

In a block 808, the second images are loaded into the second frame buffer. The second frame buffer may be coupled to the respective video projectors, for example by the video output 308 of FIG. 3. The second frame buffer may be included in the final frames module 314 on the video card 304, or in a graphics processing unit. The second frame buffer may receive secondary images such as the second image from the buffer processing module 312. Each of the secondary images may be written into the second frame buffer with a respective logical offset associated with a respective display screen output.

Thus, various embodiments disclosed herein prepare an image for projecting or result in an image being displayed on a projection screen as a corrected reconstructed image. Various embodiments make use of a first frame buffer, a second frame buffer and view projection matrixes.

In one embodiment, steps 806 and 808 occur essentially simultaneously. In other words, the "secondary images" are actually logical representations of the divided regions of the second frame buffer. The "rendering" or composing of the primary image in a first frame buffer to the second frame buffer occurs through the fragment and vertex shaders (one projector region at a time). These shaders apply each projector's specific view projection matrix and blending elements, adjusting source content and preparing each pixel of the second frame buffer associated with the target projector.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including handheld devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

While the system and method has been described in conjunction with several specific embodiments, it is evident to those skilled in the art that many further alternatives, modifications and variations will be apparent in light of the foregoing description. Thus, the embodiments described herein are intended to embrace all such alternatives, modifications, applications and variations as may fall within the spirit and scope of the appended claims.

What is claimed is:

1. A method of interfacing a host computing device with a video card for preparing an image for projection, the method comprising:
    using the host computing device to send a first image to the video card;
    having the video card process the received first image through a native graphics pipeline and storing the resultant processed first image into a private render buffer hosted by the video card, said resultant processed first image being the video card's final render content configured for a single resolution display;
    said video card supporting an application programming interface (i.e. API) executable on said host computing device, and effective for providing said host computing device with access to internal computing resources of said video card;
    by using the API, the host computing device:
        establishing a buffer processing graphics pipeline within the video card for accessing contents of said private render buffer, said buffer processing graphics pipeline being separate from said native graphics pipeline;
        loading a calibration dataset, the calibration dataset including a plurality of view projection matrixes operable to divide and transform a primary image into a plurality of secondary images that are projected by respective video projectors in an overlapping manner onto a projection screen thereby providing a corrected reconstruction of the primary image, each view projection matrix being configured for the respective resolution display characteristics of its corresponding video projector;
        accessing the processed first image from the private render buffer at regular time intervals;
        rendering each processed first image accessed from the private render buffer into a plurality of second images, through the calibration dataset, such that each of the second images corresponds to a respective one of the video projectors; and
        sending the plurality of second images to output frames coupled to the respective video projectors.

2. The method of claim 1 wherein the corrected reconstruction of the primary image reproduces the primary image as a seamless image on the projection screen, and the video projectors have differing resolution display characteristics.

3. The method of claim 2, wherein the rendering includes applying blending along at least one edge of at least one of the second images, to smooth overlapping of the second images, and the host computing device is unaware of when content is written into said private render buffer.

4. The method of claim 1 wherein the rendering includes applying warping to the second images, to compensate for alignment of the respective video projectors relative to the projection screen.

5. The method of claim 1 wherein the rendering includes applying at least one screen overlay to at least one of the second images.

6. The method of claim 1 wherein the rendering includes applying at least one of blending ramps, black level adjustments and color adjustments to the second images, to match the second images at regions of mutual overlap.

7. The method of claim 1 further comprising:
    analyzing at least one test image as projected onto the projection screen by at least one of the video projectors; and
    building the calibration data set based on analyzing the at least one test image.

8. The method of claim 1, wherein the video projectors have differing resolution display characteristics.

9. A non-transitory, tangible, computer readable medium having thereupon instructions for a computer to interface with a video card for preparing an image for projection by executing the following steps:

having the computer send a first image to the video card;
having the video card process the received first image through a native graphics pipeline and storing the resultant processed first image into a private render buffer hosted by the video card, said resultant processed first image being the video card's final render content configured for a single resolution display;
said video card supporting an application programming interface (i.e. API) executable on said computer, and effective for providing said computer with access to internal resources of said video card;
having the computer access said API to:
establish a buffer processing graphics pipeline within the video card for accessing contents of said private render buffer, said buffer processing graphics pipeline being separate from said native graphics pipeline;
load a calibration dataset, the calibration dataset including a plurality of view projection matrixes operable to transform a primary image into a plurality of secondary images that are projected by respective video projectors in an overlapping manner onto a projection screen as a corrected reconstruction of the primary image, each view projection matrix being configured for the respective resolution display characteristics of its corresponding video projector;
access the processed first image from the private render buffer at regular time intervals;
render each processed first image accessed from the private render buffer into a plurality of second images, through the calibration data set to divide and transform the accessed, processed first image into the plurality of second images, with each of the second images corresponding to a respective one of the video projectors; and
send the plurality of second images to output frames coupled to the respective video projectors.

10. The non-transitory, tangible, computer readable medium of claim 9 wherein the corrected reconstruction of the primary image, as projected on the projection screen, is essentially seamless, and said computer is unaware of when content is written into said private render buffer.

11. The non-transitory, tangible, computer readable medium of claim 10, further including:
applying blending to overlapping edges of the second images, to smooth brightness levels in a transition from one of the second images to another of the second images as projected;
wherein the video projectors have differing resolution display characteristics.

12. The non-transitory, tangible, computer readable medium of claim 9, further including:
applying warping to at least one of the second images, as compensation for alignment of a corresponding at least one of the video projectors to the projection screen.

13. The non-transitory, tangible, computer readable medium of claim 9 wherein the calibration dataset is loaded into an application, and wherein the application applies, to at least one of the second images, at least one screen overlay over at least a portion of the first image.

14. The non-transitory, tangible, computer readable medium of claim 9 wherein the calibration dataset is loaded into an application, and wherein the application applies at least one of blending ramps, black level adjustments and color adjustments to the second images for matching at regions of mutual overlap.

15. The non-transitory, tangible, computer readable medium of claim 9 having thereupon further instructions for the computer to:
build the calibration data set based on analyzing at least one test image as projected onto the projection screen by at least one of the video projectors.

16. The non-transitory, tangible, computer readable medium of claim 9 wherein the video projectors have differing resolution display characteristics.

17. A system for projecting an image, comprising:
a plurality of video projectors arranged to project respective images in an overlapping manner onto a projection screen;
a video card in communication with the plurality of video projectors;
a memory;
a computing device in communication with the video card;
wherein the computing device and video card are programmed to interface with each other by the following steps:
having the computing device send a first image to the video card;
having the video card process the received first image through a native graphics pipeline and storing the resultant processed first image into a private render buffer hosted by the video card, said resultant processed first image being the video card's final render content configured for a single resolution display;
said video card supporting an application programming interface (i.e. API) executable on said computing device, and effective for providing said computing device with access to internal resources of said video card;
having the computing device access said API to:
establish a buffer processing graphics pipeline within the video card for accessing contents of said private render buffer, said buffer processing graphics pipeline being separate from said native graphics pipeline;
load a calibration dataset into the memory, the calibration dataset including a plurality of view projection matrixes operable to divide and transform a primary image into a plurality of secondary images that are projected by the video projectors in an overlapping manner onto the projection screen thereby providing a corrected reconstruction of the primary image, each view projection matrix being configured for the respective resolution display characteristics of its corresponding video projector;
access the processed first image from the private render buffer at regular time intervals;
render each processed first image accessed from the private render buffer into a plurality of second images as a result of applying the calibration dataset, such that each of the second images corresponds to a respective one of the video projectors; and
send the plurality of second images to output frames coupled to the respective video projectors.

18. The system of claim 17 wherein the computing device is unaware of when content is written into said private render buffer.

19. The system of claim 17, wherein:
the computing device further establish a buffer processing module in the video card to access the private render buffer;
at least a portion of the memory holding the calibration data set is within the buffer processing module; and the buffer processing module renders each processed first image accessed from the private render buffer into said plurality of second images.

20. The system of claim 19 wherein:

the video projectors have differing resolution display characteristics;

the buffer processing module accesses the first image from the private render buffer and sends the plurality of second images to the output frames.

* * * * *